United States Patent [19]

Hudis

[11] 3,783,588

[45] Jan. 8, 1974

[54] POLYMER FILM ELECTRET AIR FILTER

[75] Inventor: Martin Hudis, Scotia, N.Y.

[73] Assignee: General Electric Company

[22] Filed: Dec. 20, 1971

[21] Appl. No.: 210,054

[52] U.S. Cl............. 55/126, 55/131, 55/135, 55/138, 55/149, 55/151, 55/155, 55/DIG. 39
[51] Int. Cl............................................. B03c 3/28
[58] Field of Search..................... 55/124, 126, 103, 55/DIG. 39, 130, 131, 132, 136, 137, 138, 155, 154, 142, 149, 134, 135, DIG. 4, DIG. 16, 151

[56] References Cited
UNITED STATES PATENTS

| 2,010,809 | 8/1935 | Braine............................ 55/DIG. 31 |
| 2,243,637 | 5/1941 | Landis et al...................... 55/471 X |
| 2,297,933 | 10/1942 | Yonkers, Jr....................... 417/49 X |
| 2,397,197 | 3/1946 | Newman........................... 55/473 X |
| 2,537,278 | 1/1951 | Patterson......................... 55/481 X |
| 2,926,749 | 3/1960 | Oswald.................................. 55/157 |
| 2,939,006 | 5/1960 | Oswald................................... 250/44 |
| 2,043,217 | 6/1936 | Yaglou............................. 204/312 X |
| 2,318,093 | 5/1943 | Penney............................. 204/317 X |
| 2,579,440 | 12/1951 | Palmer.................................. 55/114 |
| 2,740,184 | 4/1956 | Thomas.................................. 55/2 X |
| 2,967,119 | 1/1961 | Gutterman.............................. 134/1 |
| 2,980,202 | 4/1961 | Meyer.................................. 55/102 |
| 3,008,541 | 11/1961 | Wachter............................ 55/149 X |
| 3,117,849 | 1/1964 | Selke.................................... 55/131 |
| 3,193,912 | 7/1965 | Polin............................... 317/262 X |
| 3,375,638 | 4/1968 | Dungler............................ 55/155 X |
| 3,446,906 | 5/1969 | Zulauf.................................. 174/35 |
| 3,449,094 | 6/1969 | Baxt et al.......................... 317/3 X |
| 3,458,713 | 7/1969 | Perlman et al............... 131/262 B X |
| 3,487,610 | 1/1970 | Brown et al..................... 161/412 X |

FOREIGN PATENTS OR APPLICATIONS 611,137   10/1948   Great Britain...................... 55/150

OTHER PUBLICATIONS

"Membrane Filters & Apparatus, Bulletin No. 88, S & S" Carl Schleicher & Schuell Co., Keene, New Hampshire, 15 pages, received in the Patent Office May 13, 1966.

Primary Examiner—Dennis E. Talbert, Jr.
Attorney—John F. Ahern et al.

[57] ABSTRACT

A duct for the transmission of an air flow therethrough is provided with at least one thin film of a permanently electrically charged polymer. The polymer film electret may be oriented in the duct normal, or at some desired angle, to the air flow in which case it has small holes formed therethrough, or it may be in parallel relationship to the air flow. Electrostatic fields generated by the polymer film cause electrostatic collection on the polymer film of charged particles in the air flow. The polymer film may be adapted to be constantly moving and be rolled up onto a spool to maintain a constant efficiency of filtering.

3 Claims, 3 Drawing Figures

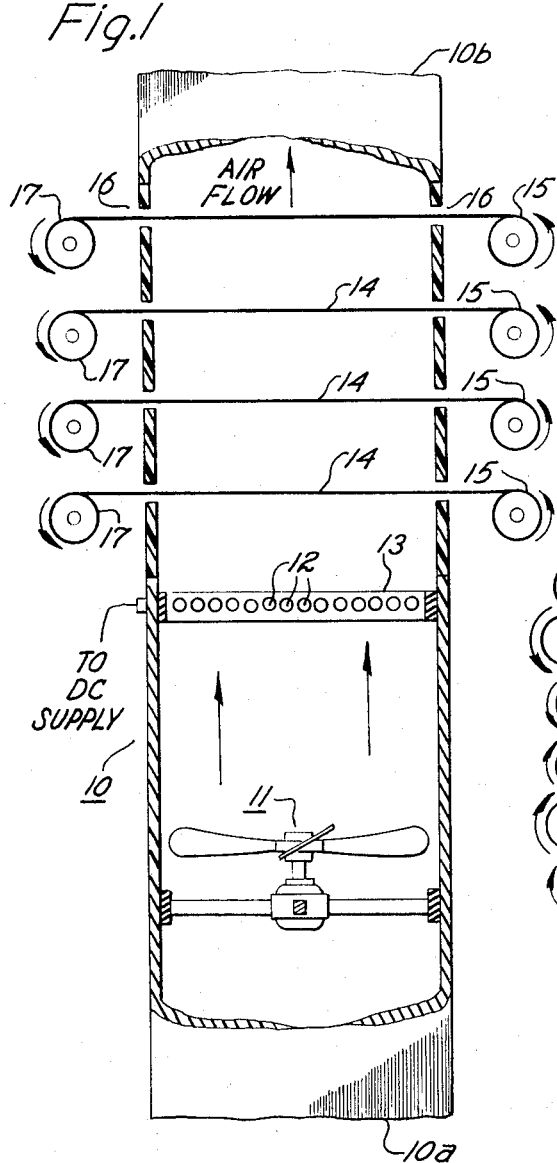
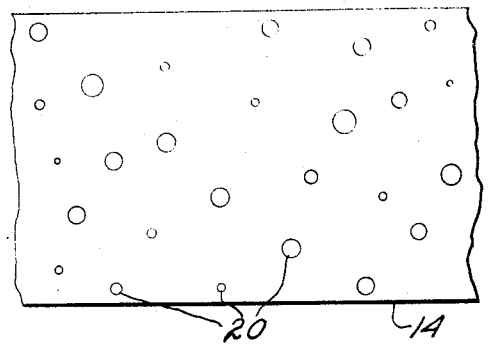
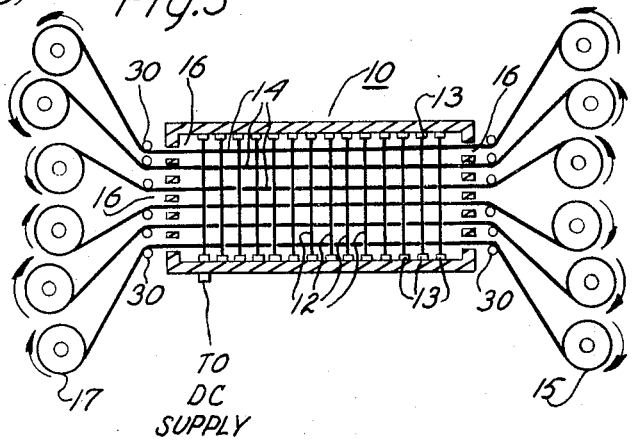

POLYMER FILM ELECTRET AIR FILTER

My invention relates to an electret type air filter having a constant efficiency of filtration, and in particular, to an air filter which collects charged particles electrostatically on one or more permanently electrified thin polymer films.

Various types of air conditioners, such as the conventional home type room air conditioner and the larger type utilized in industry for the manufacture of particular products requiring a high degree of contaminant free air, are provided with filters which provide some degree of air filtration, but in many cases such filter is inadequate. Various types of air filters are known and some of them undoubtedly may be utilized as an adjunct to room and larger size air conditioners, however, such filters generally remove only the large size particles, i.e., having diameter dimensions in excess of 100 microns.

Electrostatic filters, also known as electrostatic precipitators of the direct current (D.C.) type, are known and are capable of precipitating out particles of size smaller than 100 microns. However, the known D.C. precipitators require connection to a high voltage D.C. source and the charged particles are driven into contact with electrode plates and build up a layer which must be removed periodically if the apparatus is to continue satisfactory operation. The layer of particles on the electrode is usually removed by washing the filter which procedure is inconvenient, time consuming, subject to damage and is obviously undesired.

Therefore, a principal object of my invention is to provide an air filter which electrostatically collects charged particles and does not require periodic cleaning.

Another object of my invention is to provide an air filter in which the efficiency of filtering remains constant and is not reduced as the particles are collected.

A further object of my invention is to provide an air filter which collects particles by electrostatic precipitation but wherein the filter element is not connected to a high voltage source during operation of the filter.

In accordance with my invention, I provide an electret type air filter utilizing the electrostatic collection of charged particles on at least one thin polymer film that has previously been permanently electrically charged. The polymer film may be oriented in a duct normal to, or at a particular angle relative to an air flow therethrough which contains charged particles, in which case the air flow passes through holes formed in the polymer film. Alternatively, hole-free polymer film may be oriented parallel to the air flow and closely spaced from metal walls of the duct or comprise a plurality of closely spaced thin polymer films to thereby permit the electrostatic fields generated by the polymer film to cause the electrostatic collection of the charged particles on the polymer film. The polymer film may move slowly across the duct during operation of the filter and be rolled up onto a spool whereby the efficiency of the filtering is maintained constant and not reduced as the charged particles are collected on the film. Alternatively, the film may be stationary in the duct. A plurality of electrical conductors distributed across the duct upstream of the polymer film are connected to a source of high voltage D.C. potential for providing a corona discharge which charges the particles in the airstream as they flow thereby. The filter is especially well adapted for removing particles in the size range of 0.01 to 100 micron diameter. The embodiment of the filter with the thin polymer film oriented perpendicular, or at an angle, to the air flow also provides mechanical filtering of larger particles due to the small size of the holes through the film.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawing wherein like parts in each of the several figures are identified by the same reference character and wherein:

FIG. 1 is a top view, partly in section, of an air filter constructed in accordance with my invention wherein thin polymer films are oriented normal to the air flow;

FIG. 2 is a view of a portion of the thin polymer film utilized in my FIG. 1 filter; and FIG. 3 is an end view of a second embodiment of my filter wherein the thin polymer films are oriented parallel to the air flow.

Referring now to FIG. 1, there is shown a top view of a preferred embodiment of my filter wherein a duct 10 encloses the filter elements of my invention and has a first end 10a for the admission of an air flow thereto and a second end 10b for the exit of the air flow therefrom. The duct may be of various shapes, however, a square or rectangular cross section is preferred, although a circular or other cross section could also be utilized. A fan 11 which is typically motor driven is located adjacent the first end 10a of the duct for producing the flow of the air thereto. Fan 11 may be located within duct 10 proper or outside the duct. In the latter case, fan 11 may comprise the fan in a room type air conditioner and the first end 10a of the duct is connected to the output end of the air conditioner such that the air after passing through the air conditioner passes through duct 10 prior to exiting into the room. The flow of air produced by fan 11 may contain particles of various sizes which were not filtered out in the room air conditioner filter, and in particular, my air filter is especially well adapted for filtering out particles in the size range of 0.01 to 100 microns in diameter. It should be understood that my air filter is not restricted in its ability to filter out particles in only this size range as will be explained in detail hereinafter.

Downstream of fan 11 and located within duct 10 is a conventional means for electrically charging the particles in the air flow. Although many contaminant particles are inherently electrically charged, such charges are often weak and thus the subject means for providing a stronger electrical charge is generally required. As one example, the particle electrical charging means may consist of a planar array of spaced parallel conductors 12 extending across substantially the total cross section of duct 10 and oriented preferably normal to the axis of the air flow. Conductors 12 are preferably of equal size in the range of 0.002 to 0.05 inch in diameter and are preferably equally spaced apart in the range of 0.25 to 2.0 inch. Conductors 12 may pass separately through a wall of duct 10 but preferably are retained in an electrically insulated frame member 13 positioned along the inner surface of duct 10 as depicted in FIG. 1. An end of each of conductors 12 is connected to a common bus within duct 10 which passes through the wall for interconnection to a D.C. high voltage source having a voltage output in the order of 10 to 20 kilovolts. Other means for producing the corona discharge, including A.C. voltage means may also be utilized. Conductors 12 may be oriented vertically as shown in FIG. 1, or may be oriented horizontally, or at any intermediate angle, as desired. Duct 10 may be fabricated of an electrically nonconductive material such as plastic, or alternatively, of a conductive material such as aluminum or other metal. In the latter case, it is essential that electrical conductors 12 are electrically insulated from the walls of duct 10, and it is preferable, although not necessary, that the duct in the region of the thin polymer films 14 to be described hereinafter be fabricated of an electrically nonconductive material, as illustrated. The D.C. voltage applied to conductors 12 is sufficiently high to cause a corona discharge around each of the conductors which thereby electrically charges particles in the air flowing thereby.

Downstream of the particle electrical charging means 12 are a plurality of permanently electrically charged thin films 14 of a polymer material oriented normal to (as illustrated), or at a particular angle relative to the air flow and which comprise the basic aspect of my invention. The spacing between conductors 12 and the first film 14 is not critical. The thin films 14 are of width approaching the inner height dimension of duct 10 with film travel as shown in FIG. 1, and are fabricated from any polymer material which has a glass transition temperature such as polytetrafluoroethylene, polyethylene, polyethylene terephthalte and polymethyl methacrylate as four examples. Alternatively, thin films 14 may be of width considerably less than the height of duct 10 and are alternately staggered in their passage (or fixed position) across duct 10, that is, one film has its lower edge very close to the bottom of duct 10 and the adjacent film has its upper edge very close to the top of the duct. The film thickness is in the range of 0.25 to 10 mils. Although the filter will operate with only one thin film, a more efficient filter is obtained by utilizing a plurality of parallel thin electrified films 14, it being understood that the films may be non-parallel without affecting the efficiency of the filter. The spacing between adjacent films is not critical and is generally at least 0.5 inch. The thin polymer films are each provided with a plurality of randomly spaced small holes therethrough of diameter dimension in the range of 1 to 1,000 micron and of spacing to obtain $10^3$ to $10^4$ holes per square inch. FIG. 2 illustrates a typical portion of the polymer film 14 and indicates the randomly located, unequal size holes 20 therethrough.

It is well known that some polymers may be electrified in any shape with substantially permanent positive and negative electric charges on the opposing surfaces, and these elements are described as electrets by analogy with permanent magnets. The electrification or electrical charging of the thin polymer film is accomplished by heating the film above its glass transition temperature and then allowing the film to gradually cool to room temperature in the presence of a D.C. electric field in the order of 10–15 kilovolts per inch of film thickness. Upon cooling, electrostatic fields are produced by fringe effects around the small holes 20 (see FIG. 2) which are formed through the polymer film before (when using a hot hole forming process) or after (when using a cold hole forming process) the cooling process. The holes are generally not of the same size, are randomly located, and the holes in adjacent films 14 are not necessarily aligned. Due to the thinness of the polymer film, the electrostatic fields produced around the small holes are in the order of 10 volts per mil thickness of polymer film.

Although the permanently electrified thin polymer films 14 operate satisfactorily as filters while being maintained stationary in place across duct 10, and the scope of my invention is intended to cover the stationary films embodiment, the gradual collection of particles on the film may gradually decrease the efficiency of filtering. In order to overcome this characteristic, and also to provide a filter which does not require periodic cleaning, the polymer films 14 are unwound from supply spools 15, pass through slits 16 located in opposite side walls of duct 10 while traveling across the duct in a direction perpendicular to, or at a particular angle, relative to the air flow, and are wound onto motor driven take-up spools 17. Slits 16 have centerline axes such that the polymer film 14 in moving across duct 10 is oriented normal, or at the particular angle, to the air flow. The electrostatic fields generated around the small holes 20 provide efficient filtering for both negatively and positively charged particles in the air flow. The use of a stacking arrangement of the polymer films 14 by utilizing a plurality of the thin polymer films as illustrated in FIG. 1, achieves a mechanical filtering of the particles in the air flow, even in the absence of their being electrically charged since the air flow passes through the holes 20 in the polymer films. This mechanical filtering is especially efficient in filtering out the larger size particles (100 microns and larger) which either are larger than the largest size hole 20 of the polymer film or at least have difficulty in passing through the several nonaligned single holes 20 in the plurality of thin films.

It is thus evident that a primary advantage of my filter is that it does not require periodic cleaning in that particles are collected on the thin polymer films 14 which are slowly rolled onto the take-up spools 17 and when the supply spool 15 is exhausted, it is replaced with a new one. The slow lateral movement of the thin polymer films 14 across duct 10 maintains a constant efficiency of filtering since the efficiency is not reduced by an excessive particle accumulation on the polymer films. The polymer film travel may be in the range of 1 to 20 inches per minute and the cross-section of duct 10 may typically be 1 foot by 1 foot.

A second embodiment of my polymer film electret air filter is illustrated in the end view of FIG. 3 wherein the permanently electrified thin polymer films 14 are oriented parallel to the air flow rather than perpendicular (or at some desired angle) as in the FIG. 1 embodiment, and the air flow is therefore unimpeded. The spacing between adjacent polymer films 14 in the FIG. 3 embodiment is made much smaller than for the FIG. 1 embodiment, and is in the range of 0.01 to 0.10 inch, in order to assure sufficiently strong electric fields between adjacent films. The thin polymer films 14 are preferably (although not necessarily) in parallel relationship and are arranged such that the adjacent surfaces of adjacent films are of opposite polarity charge to thereby develop the electrostatic fields between adjacent films and assure collection of both types of polarity charged particles in the air flow. Due to the close spacing of adjacent thin polymer films 14, there is no need for the holes 20 in the films since the electrostatic field provided by fringe effects around the small holes is not the mechanism for generating the electrostatic fields in the FIG. 3 embodiment. In order to achieve the close spacing of adjacent films 14 within duct 10, a pair of idler rollers 30 are associated with each film 14 and are retained in a fixed position outside the side walls of duct 10 and are aligned with the slits 16 in the side walls of duct 10 through which the thin polymer film passes in its travel across duct 10 in a direction perpendicular, or at some desired angle, to the air flow from the supply spool 15 to the take-up spool 17. Obviously, other suitable means for maintaining the thin polymer films 14 in the required close spacing may also be utilized. As in the case of the FIG. 1 embodiment, a means for electrically charging the particles in the air flow, such as a parallel array of conductors 12 connected to a high voltage D.C. source is also utilized in the FIG. 3 embodiment. Finally, a means for producing the air flow within duct 10, not shown in FIG. 3, is also required if the air flow is not already in existence as a result of being developed in an associated appliance such as room type air conditioner. The FIG. 3 embodiment obviously does not provide the mechanical filtering for the larger size particles as is achieved in the FIG. 1 embodiment since the air flow passes between adjacent films 14. Although my FIG. 3 embodiment could also utilize only one thin film 14, this would necessitate close spacing to the top and bottom walls of duct 10 and thereby limit the cross sectional area of duct 10 and resultant air flow therethrough as well as requiring at least such portions of the adjacent duct walls to be fabricated of an electrically conductive material in order to establish the electric fields. Therefore, for most application of this second embodiment of my filter, a plurality of the thin films 14 are utilized.

Although the permanently electrified thin polymer films 14 are illustrated in the FIGS. 1 and 3 embodiments as passing horizontally across duct 10, it should be understood that my filter is equally efficient in operation if the film travel is in a vertical direction from the top of the duct to the bottom. Finally, the spacing between adjacent thin polymer films in the FIGS. 1 and 3 embodiments is illustrated as being equal although this is not a necessary limitation. It should also be appreciated that idler rollers 30 may be utilized in the FIG. 1 embodiment in order to compensate for the varying radii of the supply and take-up spools as the thin polymer film is unwound from spool 15 and wound on spool 17.

The electric fields developed around the holes in the FIG. 1 embodiment and between adjacent films in the FIG. 3 embodiment can be increased in intensity by increasing the charging voltage during cooling of the polymer film from its glass transition temperature. However, there is a limit to which the voltage can be increased (approximately 25 kilovolts per inch film thickness) for a particular thickness of the film at which decomposition of the polymer begins to occur. Operation of the filter with the increased electric field intensity increases the efficiency of particle collection in a given particle size range as well as causing the collection of larger size particles. In the case of the FIG. 3 embodiment, a stronger electric field can also be obtained between adjacent films 14 by a closer spacing thereof.

From the foregoing description, it can be appreciated that my invention makes available an improved air filter which is especially well adapted for use as an adjunct to a room air conditioner for removing particles in a size range not generally removed by the passive type filters utilized in the air conditioner apparatus. It should be understood that the room type air conditioner mentioned herein is not limited to the window mounted cooling type device but is meant to include the pure fan type device as well as the conventional home heating and cooling system, especially hot air systems. Finally, my invention may also be used as an adjunct to appliances such as stoves for removing odors and to room electric heaters, as further examples of utility. My air filter, by utilizing thin polymer film electrets as the particle collecting means has the advantage over other D.C. precipitator type filters and other active type filters in that it does not require the application of a high voltage source to the particle collecting means during operation of the filter. Further, the filter does not require periodic cleaning since the thin polymer films and the particles collected thereon are slowly wound on a take-up spool which is discarded after the entire spool is utilized. The constant movement of the thin polymer films across the duct maintains a constant efficiency of the filter which is another advantage over other type filters wherein the efficiency generally becomes reduced with extended operation of the filter. However, my invention is not limited to the moving films, and includes the use of stationary thin polymer films, it being recognized that reduced efficiency with time may occur in the stationary embodiment. Having described two embodiments of my invention, it is obvious that other means for supplying and removing the electrified thin polymer films from duct 10 may be utilized and therefore it is to be understood that changes may be made in the particular embodiments as described which are within the full intended scope of the invention as defined by the following claims.

What I claim as new and desire to secure by Letters Patent of the United States is:

1. An electret air filter adapted as an adjunct to a room air conditioner having filtering means for removing large particles and comprising a duct having an admission end connected to the output of a room air conditioner for developing an air flow through the duct, and an exit end;

means for electrically charging smaller particles not removed by the air conditioner filtering means and which may be in the air flow in the duct, and at least one thin film of permanently electrically charged polymer material disposed within and across said duct and oriented perpendicular to the air flow therein, said thin film being of thickness in the range of 0.25 to 10 mils, said thin film provided with a plurality of randomly spaced, randomly sized small holes therethrough for passage of the air to the exit end of said duct, the small holes being of size in a range of 1 to 1,000 microns and of spacing to obtain $10^3$ to $10^4$ holes per square inch, electrostatic fields produced by fringe effects around the small holes by the permanent charge on the polymer film being in the order of 10 volts per mil thickness of polymer film and causing electrostatic collection of the charged particles on the polymer film so that the air flow from the exit end of said duct has a significantly smaller amount of the particles as compared to the air flow at the admission end.

2. The electret air filter set forth in claim 1 wherein said at least one thin film of the electrically charged polymer material consists of a plurality of parallel thin films of the permanently electrically charged polymer material, the spacing between adjacent films being at least 0.5 inch.

3. The electret air filter set forth in claim 2 and further comprising means for constantly moving the parallel thin films across the duct.

* * * * *